United States Patent
Tozu et al.

[11] Patent Number: 5,829,847
[45] Date of Patent: Nov. 3, 1998

[54] VEHICLE MOTION CONTROL SYSTEM

[75] Inventors: Kenji Tozu, Yokkaichi; Yoshiyuki Yasui, Kariya; Masanobu Fukami, Hazu gun; Takayuki Itoh, Nagoya; Norio Yamazaki, Kariya, all of Japan

[73] Assignee: Aisin Seiki Kabushiki Kaisha, Kariya, Japan

[21] Appl. No.: 803,938

[22] Filed: Feb. 20, 1997

[30]     Foreign Application Priority Data

Feb. 21, 1996 [JP] Japan ................................... 8-060073

[51] Int. Cl.$^6$ ........................................................ B60T 8/66
[52] U.S. Cl. ..................... 303/167; 188/181 C; 303/169; 303/171; 303/173; 303/147; 701/74
[58] Field of Search ..................... 303/147, 146, 303/149, 148, 121, 163, 150, 169, 171, 198, 176, 167, 172, 173; 701/80, 71, 72, 73, 82, 83, 90, 74; 188/181 C; 180/197

[56]            References Cited

U.S. PATENT DOCUMENTS

| 4,836,619 | 6/1989 | Muto ........................................ 303/173 |
| 4,877,295 | 10/1989 | Yoshino ................................... 303/173 |
| 5,046,787 | 9/1991 | Kuwana et al. ...................... 188/181 C |
| 5,082,333 | 1/1992 | Fukushima et al. ....................... 701/74 |
| 5,150,952 | 9/1992 | Kuwana et al. . |
| 5,210,693 | 5/1993 | Kuwana et al. ........................ 180/197 |
| 5,559,702 | 9/1996 | Kojima et al. ........................... 303/170 |
| 5,634,699 | 6/1997 | Ichikawa et al. ........................ 303/150 |
| 5,676,434 | 10/1997 | Ichikawa et al. ........................ 303/163 |

*Primary Examiner*—Douglas C. Butler
*Attorney, Agent, or Firm*—Burns, Doane, Swecker & Mathis, LLP

[57]            ABSTRACT

The present invention is directed to a vehicle motion control system for maintaining vehicle stability by controlling the braking force applied to each wheel of a vehicle. The braking force applied to each wheel is controlled on the basis of outputs of the wheel speed sensors and the vehicle speed estimation unit. A limit value is calculated to a difference between a first estimated vehicle speed calculated for a second wheel located on the right side of the vehicle and a left estimated vehicle speed calculated for a left wheel located on the left side of the vehicle. The calculation of one of the first and second estimated vehicle speeds is limited in response to the limit value, so as to keep the estimated vehicle speed calculated for one of the right and left wheels rotating at a relatively low speed to be greater than a value subtracting the limit value from the second estimated vehicle speed provided for the other one of the right and left wheels rotating at a relatively high speed. For example, the limit value is calculated on the basis of a varying value resulted from at least a change in a coefficient of friction for each wheel of the vehicle, and varied in accordance with one of a plurality of control modes.

7 Claims, 9 Drawing Sheets

5,829,847

VEHICLE MOTION CONTROL SYSTEM

BACKGROUND OF THE INVENTION

1. Field of the Invention

The present invention relates to a vehicle motion control system for controlling vehicle motion, and more particularly to the control system for controlling a braking force applied to each wheel of the vehicle on the basis of at least a wheel speed and an estimated vehicle speed, so as to control the braking force in accordance with a desired characteristic.

2. Description of the Related Arts

Recently, a vehicle is provided with a braking force control system for controlling the braking force applied to the vehicle to perform an anti-skid control, a traction control, a front-rear braking force distribution control, etc. In general, an estimated vehicle speed is employed as a standard reference value for each control. For example, in an anti-skid control system for controlling a hydraulic braking pressure applied to each wheel cylinder, a wheel speed of each wheel is detected, and the maximum speed of the wheel speeds of the four wheels is calculated to provide an estimated vehicle speed of the vehicle, on the basis of which a standard reference speed can be calculated.

In the U.S. Pat. No. 5,150,952, for example, it is proposed to calculate an estimated vehicle speed for each wheel of a vehicle on the basis of a wheel speed and a decreasing rate of the estimated vehicle speed for at least one of the wheels other than the wheel for which the estimated vehicle speed is being calculated. In that publication, it is aimed to prevent an excessive decrease of a hydraulic braking pressure in a wheel brake cylinder from being caused by the wheel speed difference between the wheels of tires having different sizes or between the wheels located on the inside and outside of a curve in the vehicle's path, and prevent quick lock of the wheels from occurring.

According to to the prior systems for estimating the vehicle speed including the above-described system, an intermediate value of a wheel speed $Vw_{(n)}$, a wheel speed $(Vso_{(n-1)} - \alpha_{DN} \cdot \Delta t)$ which is reduced at a certain decreasing rate $\alpha_{DN}$ (e.g., 1.15 G) from an estimated vehicle speed $Vso_{(n-1)}$ calculated in a previous cycle (n−1), and a wheel speed $(Vso_{(n-1)} + \alpha_{UP} \cdot \Delta t)$ which is increased at a certain increasing rate $\alpha_{UP}$ from the estimated vehicle speed $Vso_{(n-1)}$ calculated in the previous cycle (n−1), is calculated to provide an estimated vehicle speed $Vso_{(n)}$, as follows:

$$Vso_{(n)} = MED[Vw_{(n)}, (Vso_{(n-1)} - \alpha_{DN} \cdot \Delta t), (Vso_{(n-1)} + \alpha_{UP} \cdot \Delta t)]$$

In the case where the wheel speed $Vw_{(n)}$ is largely reduced to be lower than the speed $[Vso_{(n-1)} - \alpha_{DN} \cdot \Delta t]$, however, the latter will be employed as the intermediate value, i.e., the estimated vehicle speed $VSO_{(n)}$, so that a difference between an actual vehicle speed and the estimated vehicle speed Vso will be immediately increased. Also, this will occur when the estimated vehicle speed is calculated for each wheel, thereby to cause an error during vehicle motion such as cornering due to the difference between the wheel speed of the inside wheel and the wheel speed of the outside wheel. In case of a rear drive vehicle, even in the system proposed in the above-described publication to solve the above problem, an error will be caused in the calculation of the estimated vehicle speed, when a driven wheel, i.e., rear wheel, is rapidly reduced by an engine-braking operation.

In general, when a vehicle is braked while the vehicle is undergoing a cornering maneuver, for example, the larger braking force is applied to the vehicle, the larger load shift will occur. In the braking operation, the wheel speed of the rear wheel located on the inside of the curve will be largely decreased at the outset, and the wheel speed of the front wheel located on the inside of the curve, then the wheel speed of the rear wheel located on the outside of the curve, and finally the wheel speed of the front wheel located on the outside of the curve, will be decreased at a smaller decreasing rate than the preceding wheel speed. According to the front-rear braking force distribution control, however, since the rear wheel is controlled basically at the same slip rate as the front wheel, if the wheel speed of the front wheel is continuously reduced at a decreasing rate larger than a certain decreasing rate due to the load shift to cause an error in calculating the slip rate for the front wheel, the error in calculating the slip rate for the rear wheel will be made large. With respect to the anti-skid control operation, it is necessary to calculate the estimated vehicle speed for each wheel so as to reduce the error resulted from the difference between the wheel speed of the inside wheel and the wheel speed of the outside wheel during vehicle motion such as cornering. Therefore, it is desirable not to use the maximum wheel speed as the estimated vehicle speed, but to calculate the estimated vehicle speed for each wheel. In the latter case, however, it is necessary to reduce the error resulted from the difference between the wheel speed of the inside wheel and the wheel speed of the outside wheel, i.e., the right and left wheels, during vehicle motion such as cornering, as described above.

When the vehicle is braked during vehicle motion such as cornering, the load applied to the front wheel located on the outside of the curve will be the maximum, so that it is desirable to provide a limit to the wheel speed of the front wheel located on the inside of the curve, on the basis of the wheel speed of the front wheel located on the outside of the curve. In addition, it is appropriate to provide the limit in accordance with a control mode with respect to each wheel. In case of the anti-skid control mode, for example, it is appropriate to provide the limit to the calculation of the estimated vehicle speed for the wheel having a relatively high slip rate, on the basis of the estimated vehicle speed calculated for the wheel having the minimum slip rate.

SUMMARY OF THE INVENTION

Accordingly, it is an object of the present invention to provide a vehicle motion control system wherein an appropriate estimated vehicle speed is calculated to perform a desired vehicle motion control.

In accomplishing the above and other objects, a vehicle motion control system is provided for maintaining stability of an automotive vehicle when the vehicle in motion, by controlling a braking force applied to each wheel of the vehicle. In the system, therefore, wheel speed detection means is provided for detecting a wheel speed of each wheel of the vehicle. Vehicle speed estimation means is provided for calculating an estimated vehicle speed for each wheel of the vehicle on the basis of the wheel speeds detected by the wheel speed detection means. Braking force control means is provided for controlling a braking force applied to each wheel of the vehicle. The braking force control means is adapted to be actuated at least on the basis of outputs of the wheel speed detection means and the vehicle speed estimation means. Limit value calculation means is provided for calculating a limit value to a difference between a first estimated vehicle speed calculated by the vehicle speed estimation means for a right wheel located on the right side of the vehicle and a second estimated vehicle speed calculated by the vehicle speed estimation means for a left wheel located on the left side of the vehicle. And, limitation means is provided for limiting the calculation of one of the first and second estimated vehicle speeds by the vehicle speed estimation means in response to the limit value calculated by the limit value calculation means, to keep the estimated vehicle speed calculated for one of the right and left wheels rotating at a relatively low speed to be greater than a value subtracting the limit value from the estimated vehicle speed calculated for the other one of the right and left wheels rotating at a relatively high speed.

In this system, the braking force control means is preferably adapted to control the braking force applied to each wheel of the vehicle in accordance with one of a plurality of control modes for braking the vehicle, and the limit value calculation means is preferably adapted to calculate the limit value on the basis of a varying value resulted from at least a change in a coefficient of friction for each wheel of the vehicle, and varied in accordance with one of the control modes selected in the braking force control means.

The limit value calculation means is preferably adapted to calculate the limit value on the basis of at least one of a basic limit to a lateral acceleration conversion value resulted from a difference between the wheel speed of the right wheel and the wheel speed of the left wheel, a first limit to a lateral acceleration conversion value resulted from a load shift between the right wheel and the left wheel in a turning motion of the vehicle, a second limit to a lateral acceleration conversion value resulted from a steering angle of the right wheel and the left wheel, and a third limit to a lateral acceleration conversion value resulted from a change in a coefficient of friction for each wheel of the vehicle.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENTS

Figure 1:
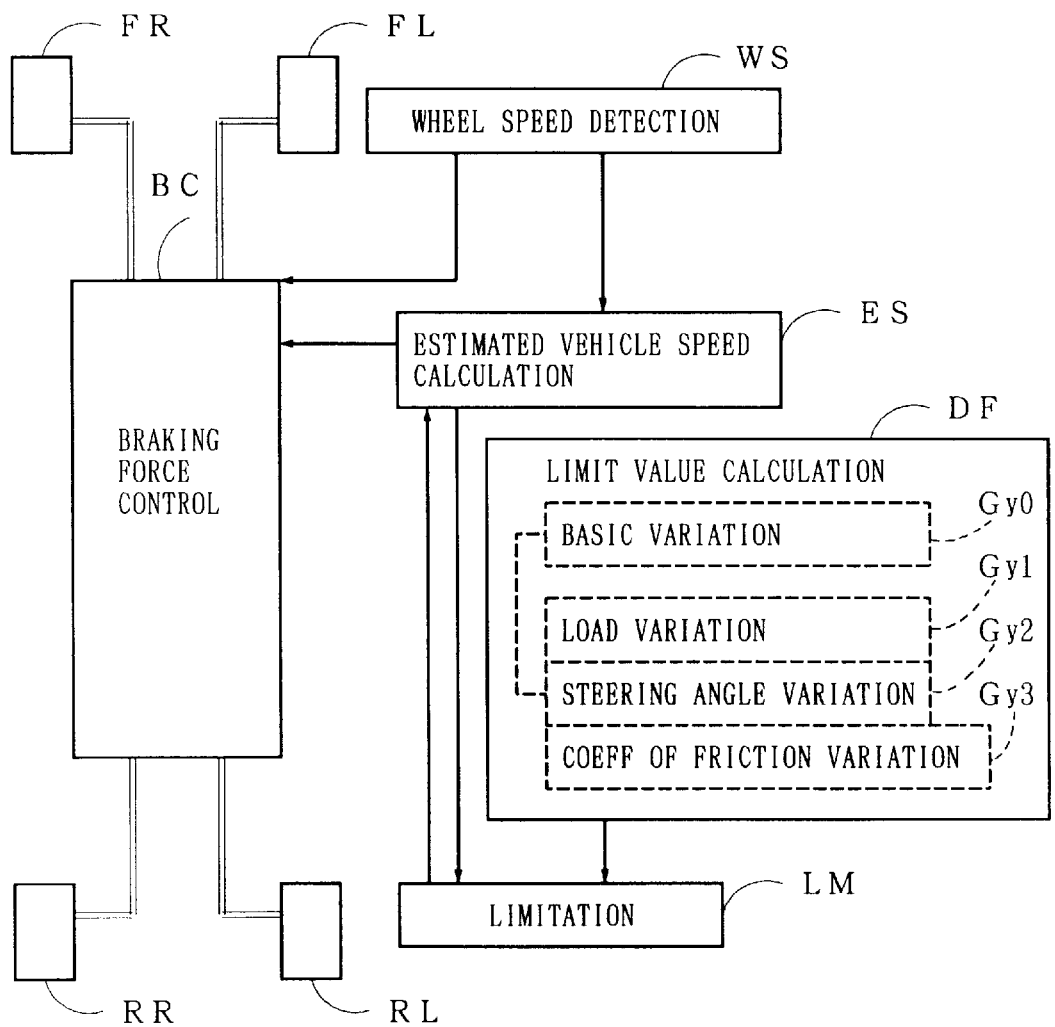
FIG. 1 is a general block diagram illustrating a vehicle motion control system according to the present invention.

Referring to FIG. 1, there is schematically illustrated a vehicle motion control system according to the present invention, which controls a braking force applied to each wheel of a vehicle individually. A wheel speed detection unit WS is provided for detecting a wheel speed of each wheel of wheels FR, FL, RR, RL of the vehicle. An estimated vehicle speed calculation unit ES is provided for calculating an estimated vehicle speed for each wheel of the vehicle on the basis of the wheel speeds detected by the wheel speed detection unit WS. A braking force control apparatus BC is provided for controlling a braking force applied to each wheel of the vehicle. The braking force control apparatus BC is adapted to be actuated at least on the basis of outputs of the wheel speed detection unit WS and the estimated vehicle speed calculation unit ES. A limit value calculation unit DF is provided for calculating a limit value to a difference between a first estimated vehicle speed calculated by the calculation unit ES for a right wheel located on the right side of the vehicle and a second estimated vehicle speed calculated by the calculation unit ES for a left wheel located on the left side of the vehicle. And, a limitation unit LM is provided for limiting the calculation of one of the first and second estimated vehicle speeds by the calculation unit ES in response to the limit value calculated by the limit value calculation unit DF, to keep the estimated vehicle speed calculated for one of the right and left wheels rotating at a relatively low speed to be greater than a value subtracting the limit value from the estimated vehicle speed calculated for the other one of the right and left wheels rotating at a relatively high speed. As illustrated by broken lines in FIG. 1, the limit value calculation unit DF may be adapted to calculate the limit value on the basis of at least one of a basic limit to a lateral acceleration conversion value which is resulted from a difference between the wheel speed of the right wheel and the wheel speed of the left wheel, a first limit to a lateral acceleration conversion value which is resulted from a load shift between the right wheel and the left wheel in a turning motion of the vehicle, a second limit to a lateral acceleration conversion value which is resulted from a steering angle of the right wheel and the left wheel, and a third limit to a lateral acceleration conversion value which is resulted from a change in a coefficient of friction for each wheel of the vehicle. The braking force control apparatus BC may include a hydraulic braking pressure control apparatus which has a master cylinder which generates a hydraulic braking pressure in response to depression of a brake pedal, as described later, and an auxiliary pressure source having a hydraulic pump and an accumulator, which generates the hydraulic braking pressure irrespective of depression of the brake pedal, even in the absence of the brake pedal input, as described later.

Figure 2:
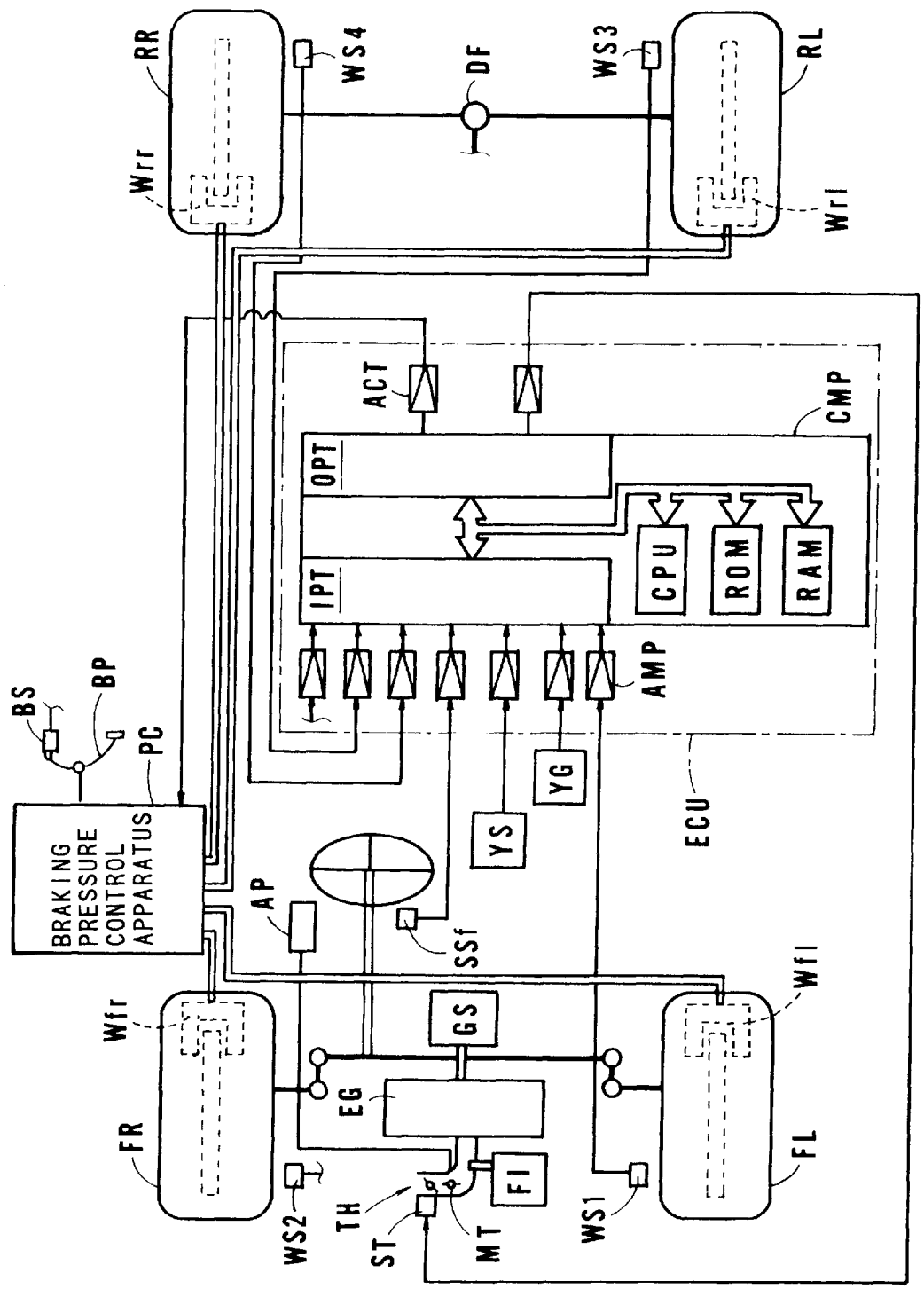
FIG. 2 is a schematic block diagram of a vehicle motion control system of an embodiment of the present invention.

More specifically, the details of the embodiment disclosed in FIG. 1 are illustrated in FIGS. 2 to 11. As shown in FIG. 2, the vehicle has an engine EG provided with a fuel injection apparatus FI and a throttle control apparatus TH which is arranged to control a main throttle opening of a main throttle valve MT in response to operation of an accelerator valve AP. The throttle control apparatus TH has a sub-throttle valve ST which is actuated in response to an output signal of an electronic controller ECU to control a sub-throttle opening. Also, the fuel injection apparatus FI is actuated in response to an output signal of the electronic controller ECU to control the fuel injected into the engine EG. According to the present embodiment, the engine EG is operatively connected with the rear wheels RL, RR through a transmission GS and a differential gear DF to provide a rear-drive system, but the present embodiment is not limited to the rear-drive system.

With respect to a braking system according to the present embodiment, wheel brake cylinders Wfl, Wfr, Wrl, Wrr are operatively mounted on the non-driven wheels FL, FR and driven wheels RL, RR of the vehicle, respectively, and which is fluidly connected to a hydraulic braking pressure control apparatus PC. The wheel FL designates the wheel at the front left side as viewed from the position of a driver's seat, the wheel FR designates the wheel at the front right side, the wheel RL designates the wheel at the rear left side, and the wheel RR designates the wheel at the rear right side. According to the present embodiment, a front-rear dual circuit system is employed, while a diagonal circuit system may be employed. The pressure control apparatus PC is arranged to be actuated in response to operation of a brake pedal BP to control the hydraulic pressure supplied to each wheel brake cylinder, and may be selected from various known types, which is not directly related to the present invention, so that the detailed explanation will be omitted.

As shown in FIG. 2, at the wheels FL, FR, RL and RR, there are provided wheel speed sensors WS1 to WS4, respectively, which are connected to an electronic controller ECU, and by which a signal having pulses proportional to a rotational speed of each wheel, i.e., a wheel speed signal is fed to the electronic controller ECU. There are also provided a brake switch BS which turns on when the brake pedal BP is depressed, and turns off when the brake pedal BP is released, a front steering angle sensor SSf for detecting a steering angle $\delta f$ of the front wheels FL, FR, a lateral acceleration sensor YG for detecting a lateral acceleration of the vehicle, and a yaw rate sensor YS for detecting a yaw rate of the vehicle. These are electrically connected to the electronic controller ECU. According to the yaw rate sensor YS, a varying rate of rotational angle of the vehicle about a normal on the center of gravity of the vehicle, i.e., a yaw angular velocity or yaw rate $\gamma$ is detected and fed to the electronic controller ECU. The electronic controller ECU is provided with a microcomputer CMP which includes a central processing unit or CPU, a read-only memory or ROM, a random access memory or RAM, an input port IPT, and an output port OPT, and etc. The signals detected by each of the wheel speed sensors WS1 to WS4, brake switch BS, front steering angle sensor SSf, yaw rate sensor YS and lateral acceleration sensor YG are fed to the input port IPT via respective amplification circuits AMP and then to the central processing unit CPU. Then, control signals are fed from the output port OPT to the throttle control apparatus TH and hydraulic pressure control apparatus PC via the respective driving circuits ACT. In the microcomputer CMP, the read-only memory ROM memorizes a program provided for performing various controls as described later, the central processing unit CPU executes the program while the ignition switch (not shown) is closed, and the random access memory RAM temporarily memorizes variable data needed to execute the program. A plurality of microcomputers may be provided for each control such as throttle control, or may be provided for performing the various controls, and electrically connected to each other.

Figure 3:
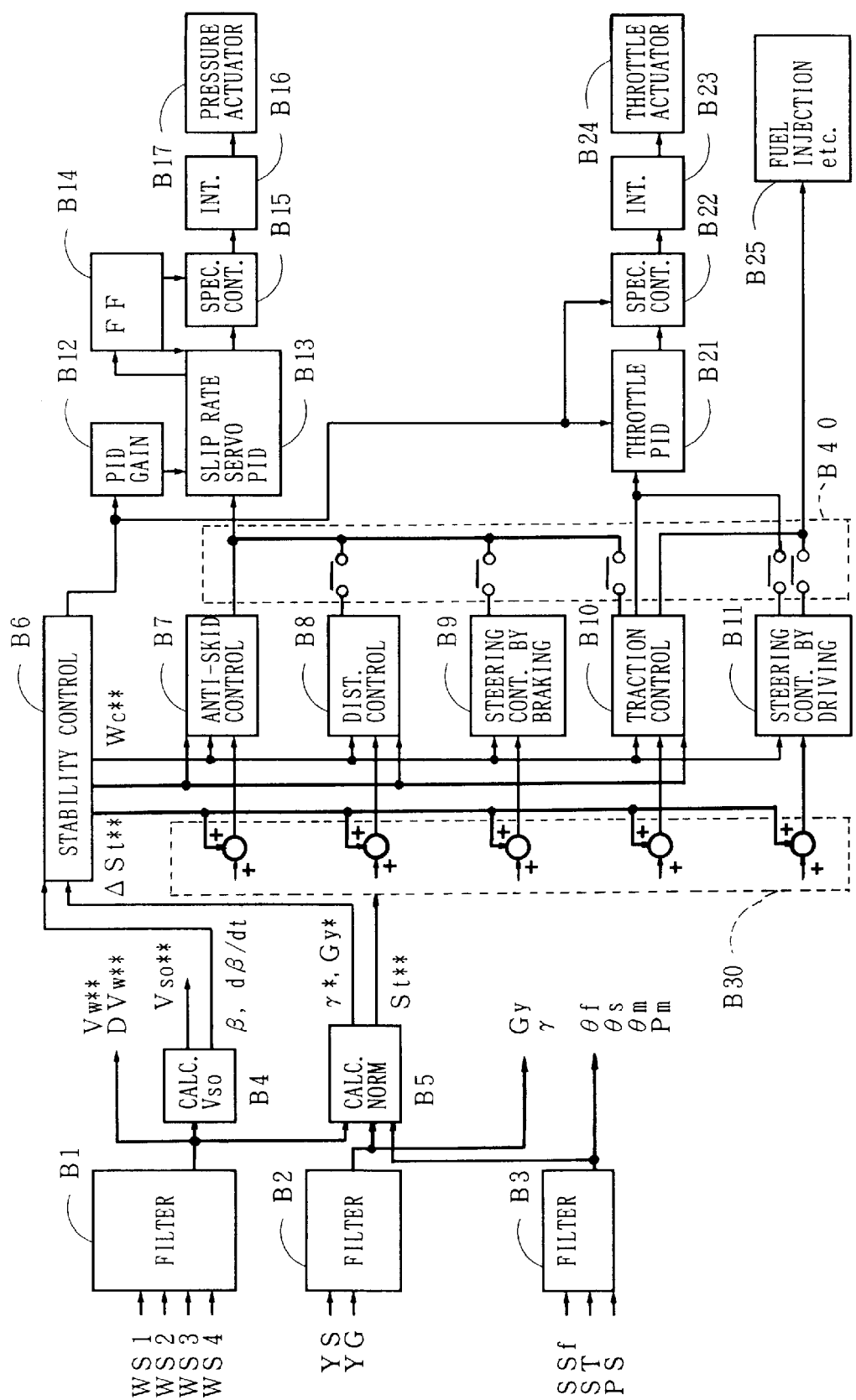
FIG. 3 is a block diagram showing blocks processed in the system of the above embodiment of the present invention.

FIG. 3 shows blocks processed in the microcomputer CMP. In a block B1 of filter and calculation, on the basis of the output signals of the wheel speed sensors WS1–WS4, a wheel speed Vw ( represents one of the wheels FL, FR, RL, RR) and a wheel acceleration DVw of each wheel are calculated. On the basis of the results of the calculation in the block B1, an estimated vehicle speed Vso for each wheel, a vehicle slip angle $\beta$ and a vehicle slip angular velocity $d\beta/dt$ are calculated in a block B4. Through a block B2 of filter, zero point correction and disturbance correction, the output signals (yaw rate $\gamma$ and lateral acceleration Gy) are fed from the yaw rate sensor YS and the lateral acceleration sensor YG into a block B5, and output signals (steering angle $\theta f$, main throttle angle $\theta m$, sub throttle angle $\theta s$, master cylinder pressure Pm) are fed from the front steering angle sensor SSf, the throttle sensor ST and the master pressure sensor PS into the block B5 through a block B3 of filter and zero point correction. Based on those signals output from the blocks B1, B2, B3, norm values are calculated in the block B5. The norm values are numeric values which represent desired states for those to be controlled, such as a desired slip rate St**, a desired yaw rate $\gamma^*$, or the like.

Then, on the basis of the results of the calculation in the blocks B4 and B5, a control mode for a vehicle stability control is provided in a block B6, so that a slip rate correction control for an oversteer restraining control is performed on the basis of the result of the calculation in the block B4, and a slip rate correction control for an understeer restraining control is performed on the basis of the result of the calculation in the block B5, so as to maintain a stability and a course trace performance of the vehicle during cornering. For example, a correction rate $\Delta St^{}$ for each correction control is added to the desired slip rate St. The oversteer restraining control is provided for applying the braking force to a front wheel located on the outside of the curve in the vehicle's path of motion, for example, and forcing the vehicle to turn in a direction toward the outside of the curve, so as to prevent an excessive oversteer from occurring during cornering. On the other hand, the understeer restraining control is provided for applying the braking force to a front wheel located on the outside of the curve and both of the rear wheels, for example, and forcing the vehicle to turn in a direction toward the inside of the curve and reduce the vehicle speed, so as to prevent an excessive understeer from occurring during cornering. In addition, a throttle control by PID (proportional control, integral control, derivative control) may be made in a block B21, if necessary, so as to maintain the desired vehicle turning motion.

In a block B7, a control mode for an anti-skid control is provided, so that the braking force applied to each wheel is controlled so as to prevent the wheel from being locked during the vehicle braking operation. In a block B8, a control mode for a front-rear braking force distribution control is provided, so that a distribution between the braking force applied to the rear wheels and the braking force applied to the front wheels is controlled so as to maintain the vehicle stability during the vehicle braking operation. In a block B9, a control mode for a steering control by braking is provided, so that the braking force is applied to each wheel so as to perform the oversteer restraining control and the understeer restraining control when the vehicle is undergoing a cornering maneuver without the brake pedal BP depressed. Further, in a block B10, a control mode for a traction control is provided, so that the braking force is applied to a driven wheel and the PID throttle control is performed in the block B21, so as to prevent the driven wheel from slipping during the vehicle driving operation. In a block B11, a control mode for a steering control through a driving force control is provided, so that the oversteer restraining control and the understeer restraining control are performed through the throttle control when the vehicle is undergoing the cornering maneuver without the brake pedal BP depressed. In a block B30, a desired slip rate St** is set for each control mode provided in each of the blocks B7 to B11, respectively. Then, one of the control modes is selected in accordance with a certain priority determined in a block 40, and processed in the blocks B12 to B17 and/or the blocks B21 to B24, respectively. In case of the anti-skid control mode, for example, a slip rate servo PID control is provided in a block B13, and a specific control is provided in a block B15, and then a control signal is fed through an interface B16 to a block 17 in which an actuator having a plurality of solenoid valves is actuated by the control signal. In response to the output of the block B6, therefore, a PID gain is set in the block 12, and the slip rate servo control is performed by the PID control in the block 13. In accordance with the conditions of the servo control, an amount of feedforward (FF) is set in a block 14, and fed to the block B15 where a hydraulic pressure correction is made through the feedforward, as the specific control. Likewise, the throttle PID control is made in the block B21, specific control in the block B22, and a control signal is fed through an interface B23 to the block B24 in which a throttle actuator is actuated. A block 25 includes an electronic controlled fuel injection system and etc., by which an ignition timing is delayed or a fuel supply is stopped in response to the outputs of the blocks B10 and B11.

Figure 4:
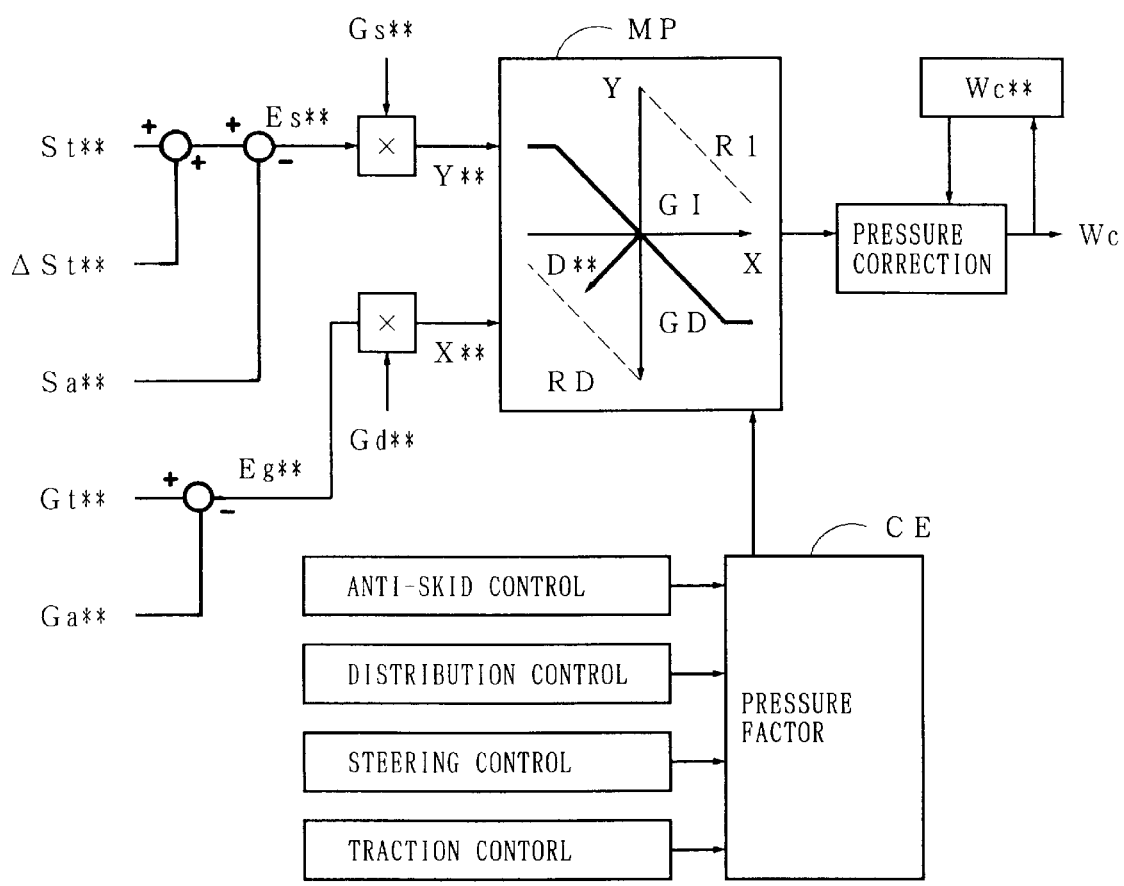
FIG. 4 is a block diagram showing a function for a hydraulic pressure servo control according to the above embodiment of the present invention.

FIG. 4 shows the hydraulic pressure servo control wherein a wheel cylinder pressure for each wheel is controlled through the slip rate servo control. At the out set, a correction slip rate $\Delta St^{}$ which is provided for the anti-skid control or the like is added to the desired slip rate $St^{}$ for each wheel of the vehicle to renew the desired slip rate $St^{}$. Based on the wheel speed $Vw^{}$ for each wheel and the estimated vehicle speed $Vso^{}$ (or, a normalized estimated vehicle speed $NVso^{}$), an actual slip rate $Sa^{**}$ used in the anti-skid control for each wheel is calculated in accordance with the following equation:

$$Sa^{}=(Vso^{}-Vw^{}-BVw^{})/Vso^{**}$$

where $BVw^{**}$ indicates a bias speed.

In the front-rear braking force distribution control, an actual slip rate $SaR^*$ for each rear wheel is calculated in accordance with the following equation:

$$SaR^*=(VsoF^*-VsoR^*+BVWR)/VsoF^*$$

where $VsoF^*$ is the estimated vehicle speed for each front wheel, $VsoR^*$ is the estimated vehicle speed for each rear wheel, and BVWR indicates a bias speed for the distribution control. Likewise, various actual slip rates $Sa^{**}$ are calculated, respectively, in accordance with the various control modes.

Then, a difference between the actual slip rate $Sa^{}$ and the sum of the desired slip rate $St^{}$ and the correction slip rate $\Delta St^{}$, i.e., a slip rate deviation $Es^{}$ is calculated to provide a parameter $Y^{}$ by multiplying the slip rate deviation $Es^{}$ by a certain gain $Gs^{}$, i.e., $Y^{}=Gs^{} \cdot Es^{}$. Also, a difference between an actual acceleration $Ga^{}$ and a desired acceleration $Gt^{}$, i.e., an acceleration deviation $Eg^{}$ is calculated to provide a parameter $X^{}$ by multiplying the acceleration deviation $Eg^{}$ by a certain gain $Gd^{}$, i.e., $X^{}=Gd^{} \cdot Eg^{}$. In stead of the desired acceleration $Gt^{}$, however, may be employed an acceleration $DVso^{}$ which is a differential value of the estimated vehicle speed $Vso^{}$. Also, in stead of the actual acceleration $Ga^{}$, may be employed an acceleration $DVw^{}$ which is a differential value of the wheel speed $Vw^{**}$.

On the basis of the parameters $X^{}$ and $Y^{}$, a pressure control mode for each wheel is provided, in accordance with a control map MP as shown in FIG. 4. The control map MP has a X-Y coordinate with a control target located on its origin. A pair of lines are provided on each side of, and in parallel with a standard line lying on the origin to divide the coordinate into four zones of a rapid pressure decreasing zone RD, a pulse pressure decreasing zone GD, a pulse pressure increasing zone GI, and a rapid pressure increasing zone RI. On the basis of the parameters $X^{}$ and $Y^{}$, is obtained a control parameter $D^{}$ which corresponds to a length of a perpendicular from a random point to the standard line lying on the origin of the control map MP, i.e., a distance from the standard line. In the zones GI and GD, a period $Tpr^{}$ and on-time $Ton^{}$ of a control pulse signal are set, such that the period $Tpr^{}$ is calculated in response to the control parameter $D^{**}$, for example in accordance with the following equation:

$$Tpr^{}=K1-K2 \cdot D^{}$$

where K1, K2 are constants.

A pressure gradient corresponding to each control target is set for each control mode as shown in FIG. 3, e.g., the anti-skid control mode, and the on-time for the control pulse signal positioned in the vicinity of the origin of the X-Y coordinate is set, on the control map MP, to provide a pressure factor CE. Then, a duty of the control pulse signal for actuating the solenoid valve for use in the pressure control is adjusted, and the pressure correction control is performed to the wheel cylinder pressure $Wc^{**}$ in each wheel cylinder Wc.

Figure 5:
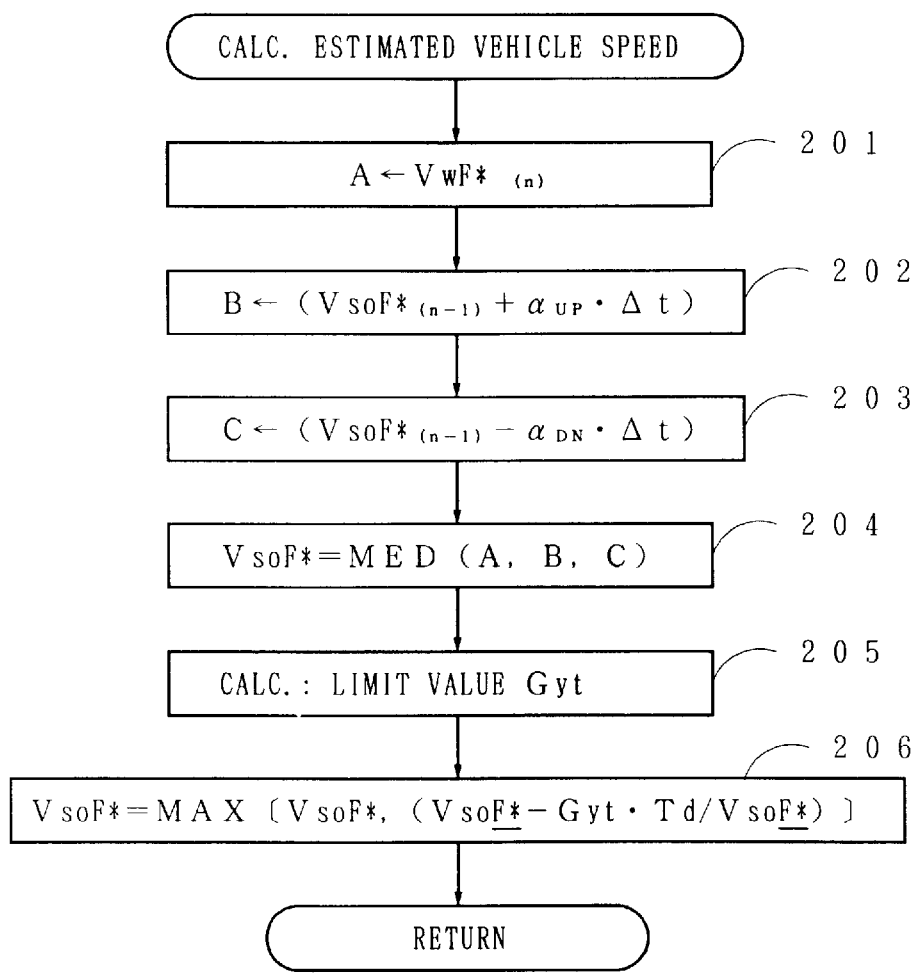
FIG. 5 is a flowchart for calculating an estimated vehicle speed according to the above embodiment of the present invention.

As an example of the calculation of the estimated vehicle speed performed in the block B4 in FIG. 4, the estimated vehicle speed for the front-rear distribution control is calculated as shown in FIG. 5, which illustrates an example of the front wheel $F^*$ ("F" represents Front, and * represents R or L, i.e., right or left) of the non-driven wheel. The wheel speed $VwF^*$ is memorized in the memory at a predetermined operation period. At the outset, a wheel speed $VwF^*_{(n)}$ in the present cycle (n) is set as "A" at Step 201. Then, a predetermined value $\alpha_{UP} \cdot \Delta t$ is added to the estimated vehicle speed $VsoF^*_{(n-1)}$ in the previous cycle (n-1) to provide "B" at Step 202, and a predetermined value $\alpha_{DN} \cdot \Delta t$ is subtracted from the previous value to provide "C" at Step 203. The program proceeds to Step 204 where the intermediate value of "A", "B" and "C" (MED represents a function for providing the intermediate value) is calculated to provide the estimated vehicle speed $VsoF^*$ for the wheel $F^*$. "$\alpha_{UP}$" is a value to provide a limit to an acceleration or an increasing rate of the wheel speed $VwF^*$, and set to be 2 G (G is a gravitational acceleration), for example. "$\Delta t$" is the operation period, and set to be 10 milliseconds, for example. "$\alpha_{DN}$" is a value to provide a limit to a deceleration or a decreasing rate of the wheel speed $VwF^*$, and set to be 1.15 G, for example.

The estimated vehicle speed $VsoF^*$ is calculated at Steps 205, 206. In the case where the front wheel rotating at the lower speed (i.e., having the higher slip rate) is a control wheel $F^*$, while the front wheel rotating at the higher speed (i.e., having the lower slip rate) is a symmetric wheel F*, the estimated vehicle speed $VsoF^*$ for the control wheel $F^*$ is determined in accordance with the equation as recited at Step 206 to be the larger one of "VsoF*" calculated at Step 204 and (VsoF*–Vfd). "VsoF*" is the wheel speed of the symmetric wheel F*. "Vfd" is calculated in accordance with the equation of Vfd=Gyt·Td/VsoF*, where "Td" is a tread of the front wheels. Thus, a limiting control is made to the right and left wheels so as to keep the first estimated vehicle speed provided for one of the right and left wheels rotating at the lower speed to be greater than a value subtracting the limit value from the second estimated vehicle speed provided for one of the right and left wheels rotating at the higher speed. On the contrary, in the case where the front wheel rotating at the higher speed (i.e., having the lower slip rate) is the control wheel F*, while the front wheel rotating at the lower speed (i.e., having the higher slip rate) is the symmetric wheel F*, the estimated vehicle speed VsoF* for the control wheel F* is determined to be "VsoF*" calculated at Step 204, because "VsoF*" is greater than (VsoF*–Vfd), in accordance with the equation recited at Step 206.

Figure 6:
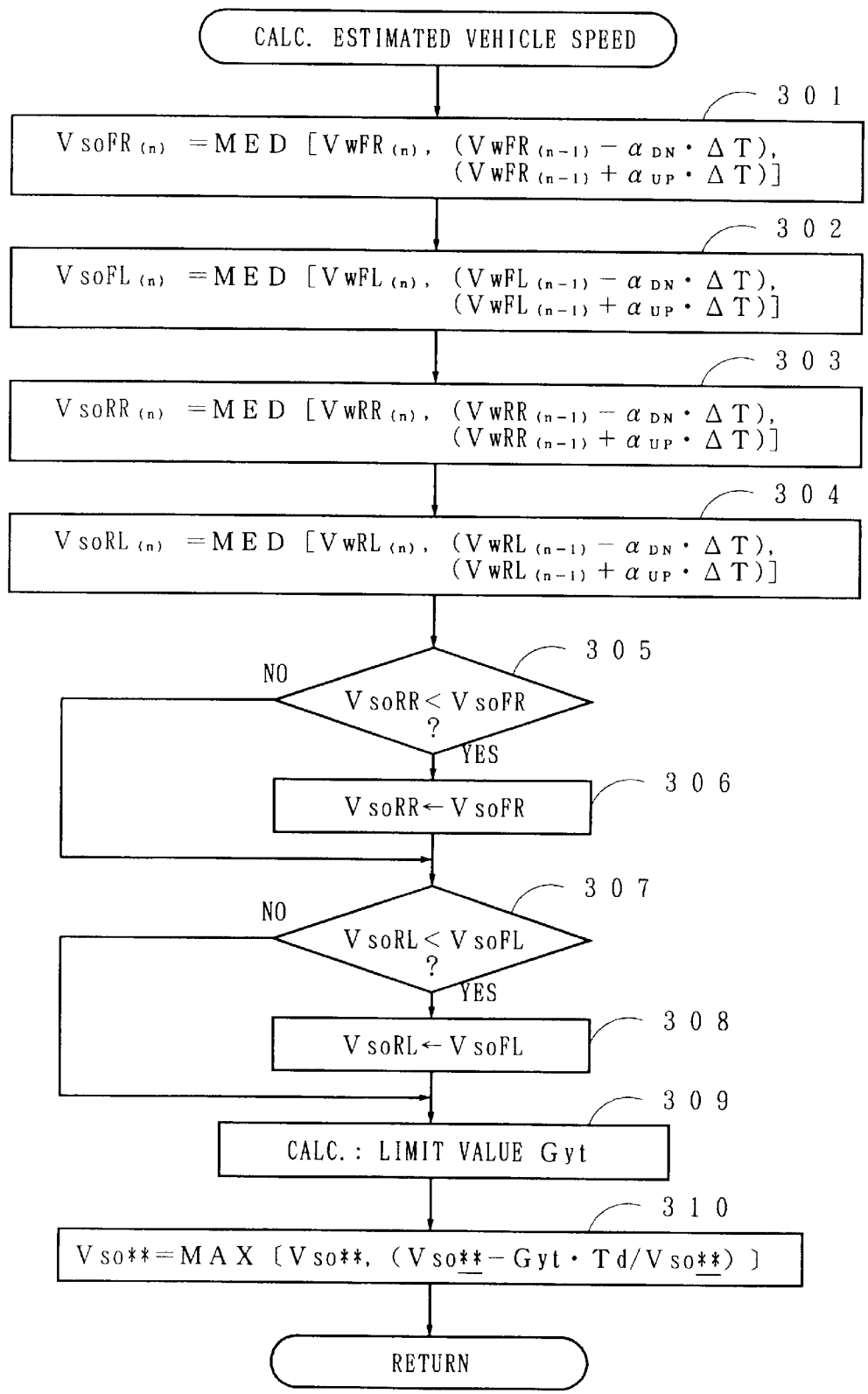
FIG. 6 is a flowchart for calculating the estimated vehicle speed according to the above embodiment of the present invention.

FIG. 6 shows the calculation of the estimated vehicle speed Vso for each wheel obtained in the anti-skid control operation, wherein the estimated vehicle speed for each of the rear wheels of the vehicle is compared with the estimated vehicle speed for one of the front wheels located on the same side as either one of the right and left sides of the rear wheels to be calculated, and the larger one is selected as the estimated vehicle speed for the rear wheel. At steps 301 to 304, the estimated vehicle speed Vso for each wheel is calculated in order. At Step 301, the same operation is made with respect to the wheel FR as the one operated at Steps 201 to 204 as shown in FIG. 5. That is, the intermediate value (MED) of the wheel speed VwFR$_{(n)}$ in the present cycle (n), the wheel speed (VwFR$_{(n-1)}$–α$_{DN}$·Δt) which is reduced at the deceleration of the value a DN from the wheel speed VwFR$_{(n-1)}$ in the previous cycle (n−1), and the wheel speed (VwFR$_{(n-1)}$ +α$_{UP}$·Δt) which is increased at the acceleration of the value α$_{UP}$ from the wheel speed VwFR$_{(n-1)}$ in the previous cycle is calculated to provide the estimated vehicle speed VsoFR$_{(n)}$. Likewise, the estimated vehicle speeds VsoFL$_{(n)}$, VsoRR$_{(n)}$, VsoRL$_{(n)}$ are provided for the wheels FL, RR, RL.

Then, the program proceeds to Steps 305 to 308, where the estimated vehicle speed VsoFR (VsoFL) for the front wheel FR (FL) is compared with the estimated vehicle speed VsoRR (VsoRL) for the rear wheel RR (RL) in magnitude, so that the larger one is set for the estimated vehicle speed VsoRR (VsoRL) for the rear wheel RR (RL). Then, a limit value Gyt to a total lateral acceleration conversion value is calculated at Step 309, and the estimated vehicle speed Vso for each wheel is obtained at Step 310. That is, in the case where the wheel rotating at the lower speed (i.e., having the higher slip rate) is the control wheel , while the wheel rotating at the higher speed (i.e., having the lower slip rate) is the symmetric wheel , the estimated vehicle speed Vso for the control wheel  is determined in accordance with the equation as recited at Step 310 to be the larger one of "Vso" calculated at Steps 301 to 304 and (Vso–Vd), where "Vso" is the wheel speed of the symmetric wheel , and "Vd" is calculated in accordance with the equation of Vd=Gyt·Td/Vso. Thus, a limiting control is made to the right and left wheels so as to keep the first estimated vehicle speed provided for one of the right and left wheels rotating at a relatively lower speed to be greater than a value subtracting the limit value from the second estimated vehicle speed provided for one of the right and left wheels rotating at a relatively higher speed. On the contrary, in the case where the wheel rotating at the higher speed (i.e., having the lower slip rate) is the control wheel , while the wheel rotating at the lower speed (i.e., having the higher slip rate) is the symmetric wheel , the estimated vehicle speed Vso for the control wheel  is determined to be "Vso" calculated at Steps 301 to 304, because "Vso" is greater than (Vso**–Vd), in accordance with the equation recited at Step 310.

Figure 7:
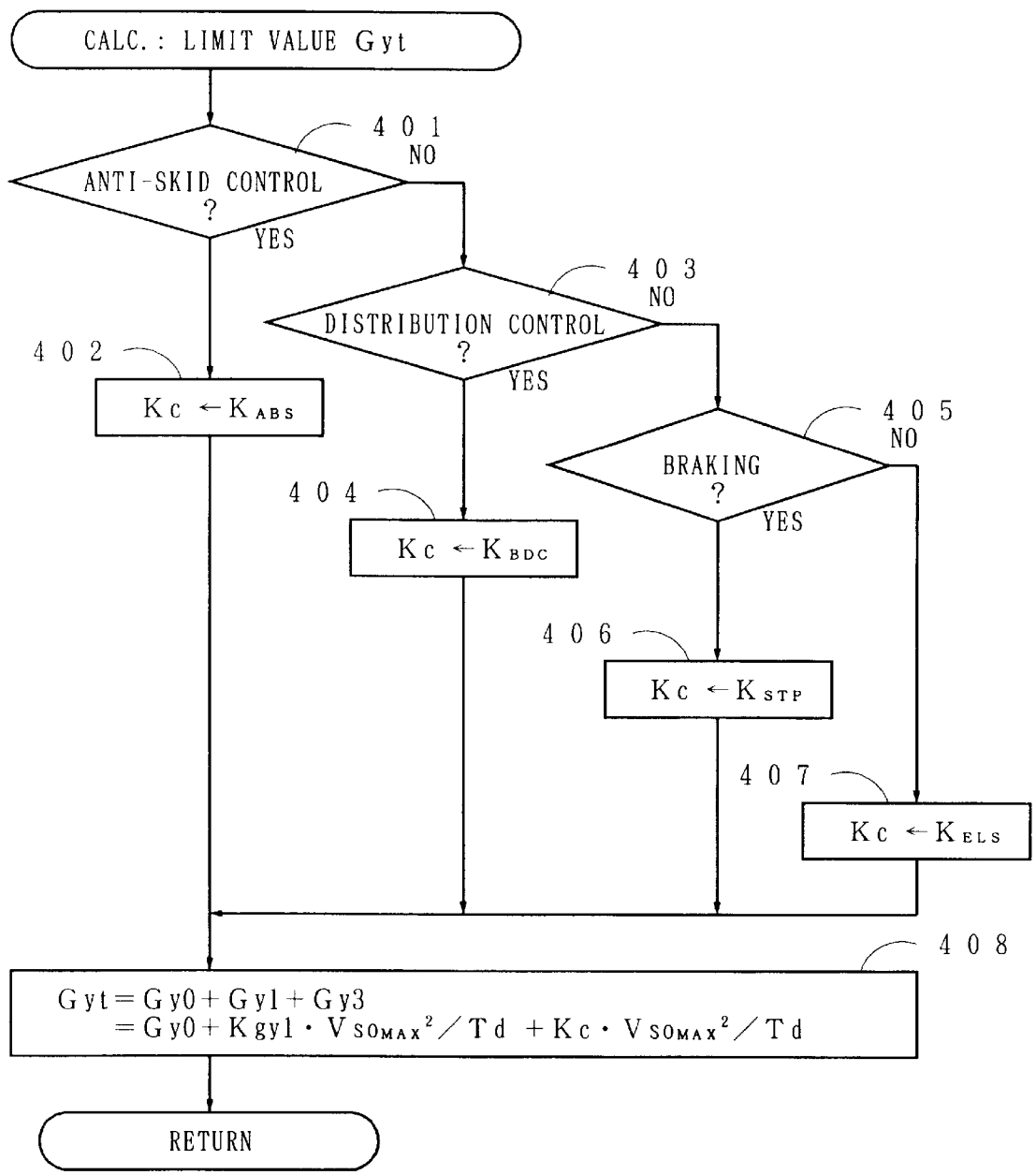
FIG. 7 is a flowchart for calculating a total lateral force according to the above embodiment of the present invention.

Referring to FIG. 7, in order to calculate the limit value Gyt of the total lateral acceleration conversion value for use in Step 205 and Step 309, a factor Kc is provided for each of the control modes such as the anti-skid control mode, in advance. It is determined at Step 401 whether the anti-skid control is being performed or not. If the result is affirmative, the program proceeds to Step 402 where a factor K$_{ABS}$ is set for the factor Kc. If the result is negative, the program proceeds to Step 403 where it is determined whether the front-rear distribution control is being performed or not. If the result is affirmative, the program proceeds to Step 404 where a factor K$_{BDC}$ is set for the factor Kc. If the result is negative, the program proceeds to Step 405 where it is determined whether the vehicle is being braked or not. If the result is affirmative, the program proceeds to Step 406 where a factor K$_{STP}$ is set for the factor Kc. If the result is negative, the program proceeds to Step 405 where a factor K$_{ELS}$ is set for the factor Kc. Then, the program proceeds to Step 408 where the limit value Gyt is calculated in accordance with the following equation:

$$Gyt=Gy0 +Gy1 +Gy3 =Gy0 +Kgy1·Vso_{MAX}{}^2/Td+Kc·VSO_{MAX}{}^2/Td$$

where Vso$_{MAX}$=MAX (Vso, Vso).

The limit value Vfd to the difference between the estimated vehicle speeds of the front right and front left wheels will approximate the sum of typical four paragraphs as explained hereinafter with respect to the front-rear braking force distribution control. In order to calculate the estimated vehicle speed for the control wheel F*, a basic limit value to a basic variation of a lateral acceleration conversion value is set to a value Gy0·Td/VsoF*, where "Td" is a tread for the front wheels. Then, a first limit value to a load variation of the lateral acceleration conversion value is set to a value εGy1·VsoF*, a second limit value to a steering angle variation of the lateral acceleration conversion value is set to a value εGy2·VsoF*, and a third limit value to a coefficient of friction variation of the lateral acceleration conversion value is set to a value εGy3 ·VsoF*. The limit value Vfd may be calculated in accordance the following equation:

$$Vfd=Gy0·Td/VsoF*+ΣεGyi·VsoF*$$

Therefore, the limit value Gyt is calculated in accordance with the following equation with the sum of the limit values to the various lateral acceleration conversion values:

Gyt
  =Vfd  VsoF*/Td
  =Gy0+ΣεGyi·VsoF*$^2$/Td
  =Gy0+Gy1+Gy2+Gy3

That is, the limit value Gyt may be converted into only the sum of the limit values Gy0, Gy1, Gy2, Gy3 to the various lateral acceleration conversion values.

Figure 8:
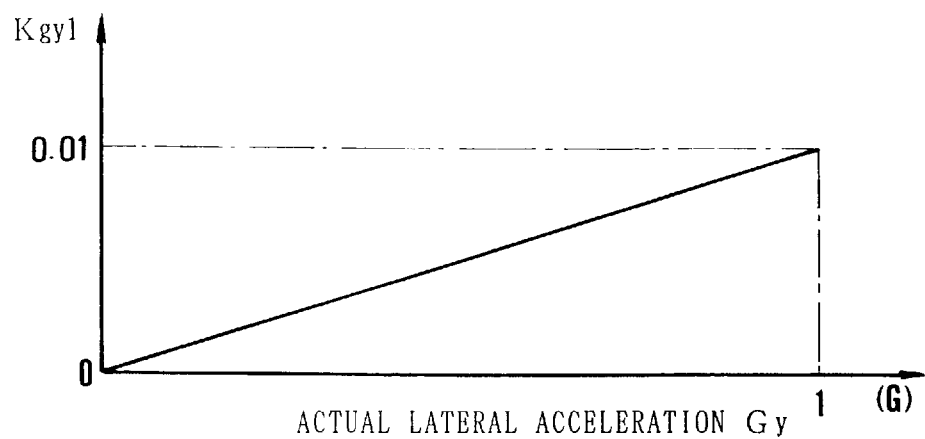
FIG. 8 is a diagram showing the relationship between an actual lateral acceleration and a factor Kgy1 according to the above embodiment of the present invention.
Figure 9:
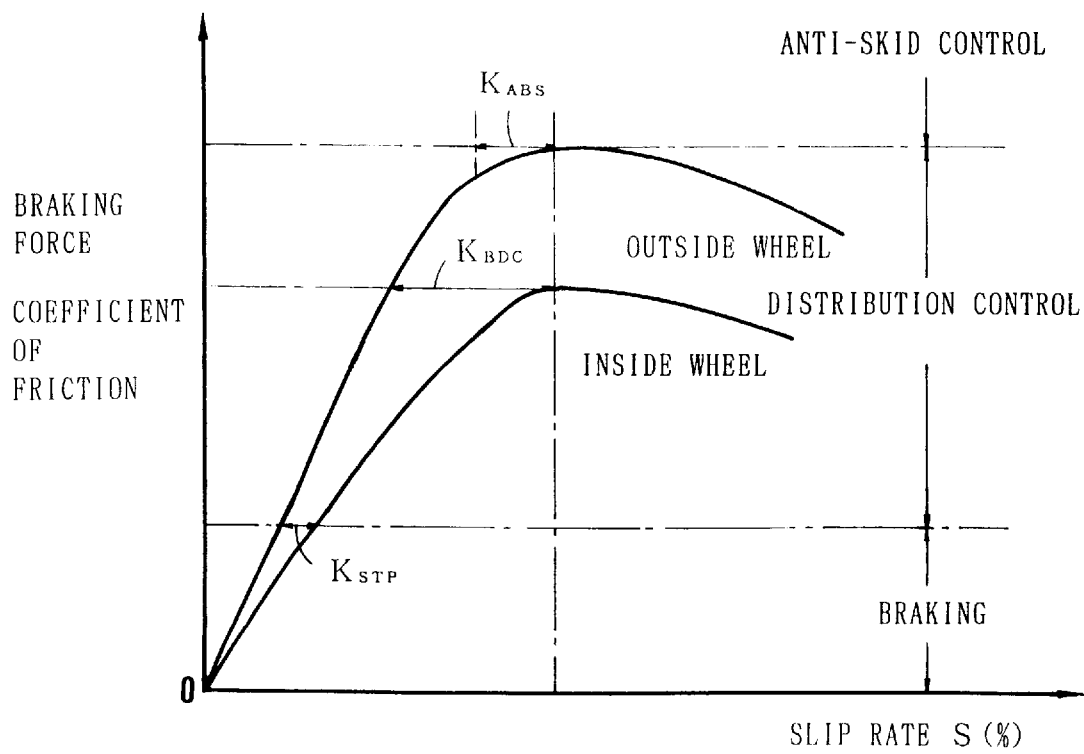
FIG. 9 is a diagram showing the relationship between a coefficient of friction and a slip rate according to the above embodiment of the present invention.

The limit value Gy0 to the basic variation of the lateral acceleration conversion value is set to one, i.e., Gy0=1. The first limit value Gy1 to the load variation of the lateral acceleration conversion value corresponds to the value of Kgy1·VSO$_{MAX}{}^2$/Td, which is calculated at Step 408 in FIG. 7. The factor Kgy1 is set in accordance with the actual lateral acceleration Gy as shown in FIG. 8. The second limit value Gy2 to the steering angle variation of the lateral acceleration conversion value is set in accordance with $[1-(\cos\theta f)^{-1}]$, e.g., $-0.38\%$, $-1.02\%$, $-3.53\%$, $-6.42\%$, to the steering angles $5°$, $10°$, $15°$, $20°$, respectively, and $-3.53\%$ to the maximum steering angle $15°$. The third limit value Gy3 to the coefficient of friction variation of the lateral acceleration conversion value relates to so-called $\mu$ stiffness, and corresponds to $Kc \cdot Vso_{MAX}{}^2/Td$, which is calculated at Step 408 in FIG. 7. The factor Kc corresponds to the slip rate deviation $\Delta Smax$ calculated as follows:

$$\Delta Smax = |S^{} - S\underline{}|$$

where "$S^{}$" is the slip rate for the control wheel, and "$S\underline{}$" is the slip rate for the symmetric wheel. As shown in FIG. 9, the factor Kc is the deviation between the slip rate of the control wheel $$, e.g., the wheel located on the inside of the curve, and the slip rate of the symmetric wheel $\underline{}$, e.g., the wheel located on the outside of the curve. For example, the factor $K_{ABS}$ (e.g., 5%) is set for the factor Kc used in the anti-skid control as shown in FIG. 7. Likewise, the factor $K_{BDC}$ used in the front-rear distribution control is set to 7%, and the factor $K_{STP}$ used in the ordinary braking operation is set to 4%.

Figure 10:
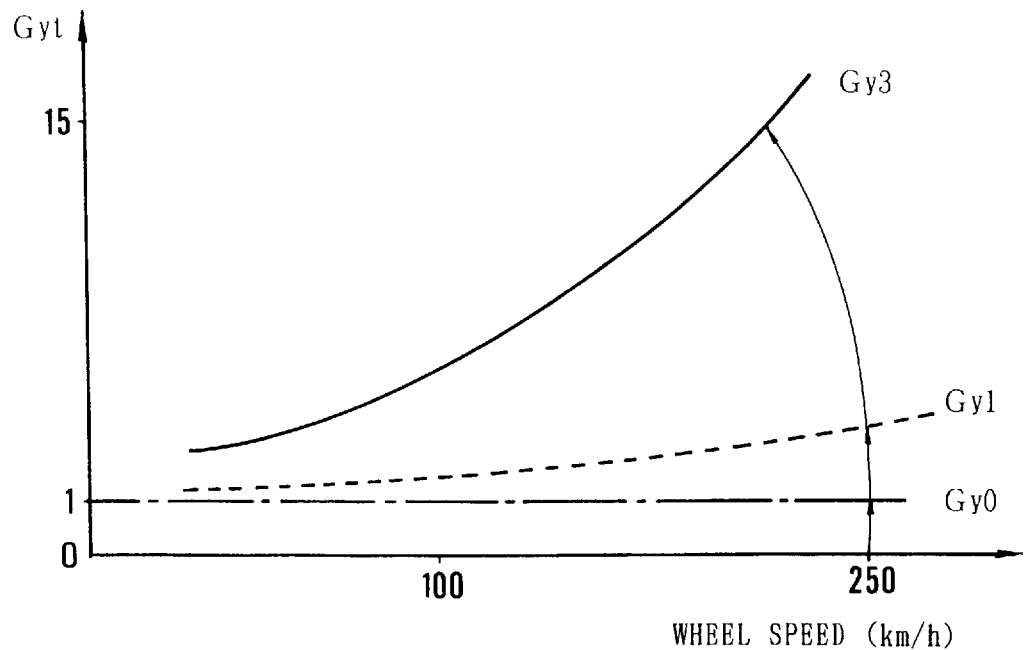
FIG. 10 is a diagram showing the relationship between a wheel speed and a limit value of a lateral acceleration conversion value according to the above embodiment of the present invention.

The limit values to the variation of the lateral acceleration conversion values are summed up, i.e., Gy0+Gy1 +Gy2+ Gy3, to provide the limit value Gyt. In this respect, if the maximum values of the factors are summed up, except for the value Gy2 of the negative value, the maximum value of the limit value Gyt will be impractical as shown in FIG. 10, but may be employed for the control. Among the limit values, the coefficient of friction variation of the lateral acceleration conversion value relating to the $\mu$ stiffness is most influential, and the third limit value Gy3 to this variation is varied in accordance with the control modes as explained before.

Figure 11:
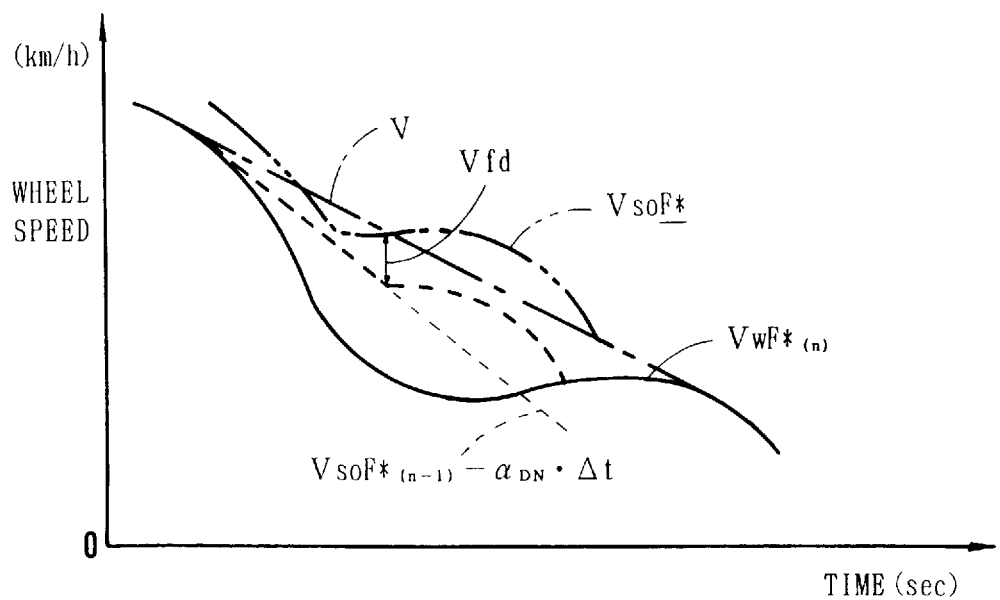
FIG. 11 is a diagram showing a variation of a wheel speed according to the above embodiment of the present invention.

According to the present embodiment, therefore, the estimated vehicle speed VsoF* of the front control wheel F* is controlled to have a difference smaller than the limit value Vfd comparing with that of the symmetric wheel $\underline{F*}$, so that the estimated vehicle speed VsoF* is not greatly reduced to approximate an actual vehicle speed V, as shown in FIG. 11. According to the prior system, the estimated vehicle speed VsoF* is reduced at a certain decelerationa DN as shown by a broken line in FIG. 11. Whereas, if the wheel speed VwF*$_{(n)}$ is less than the value (VsoF*$_{(n-1)}-\alpha_{DN} \cdot \Delta t$), the estimated vehicle speed VsoF* in the present embodiment is calculated in accordance with the following equation at Step 206 in FIG. 5:

$$VsoF^* = MAX[VsoF^*, (Vso\underline{F*} - Vfd)]$$

As a result, the estimated vehicle speed VsoF* follows the estimated vehicle speed Vso$\underline{F*}$ of the symmetric wheel with the difference of the limit value Vfd therebetween as shown by a broad broken line in FIG. 11.

It should be apparent to one skilled in the art that the above-described embodiment is merely illustrative of but one of the many possible embodiments. Numerous and various other arrangements can be readily devised by those skilled in the art without departing from the spirit and scope of the invention as defined in the following claims.

What is claimed is:

1. A vehicle motion control system for maintaining stability of an automotive vehicle when said vehicle in motion, by controlling a braking force applied to each wheel of said vehicle, comprising:

wheel speed detection means for detecting a wheel speed of each wheel of said vehicle;

vehicle speed estimation means for calculating an estimated vehicle speed for each wheel of said vehicle on the basis of the wheel speeds detected by said wheel speed detection means;

braking force control means for controlling a braking force applied to each wheel of said vehicle, said braking force control means being actuated at least on the basis of outputs of said wheel speed detection means and said vehicle speed estimation means;

limit value calculation means for calculating a limit value to a difference between a first estimated vehicle speed calculated by said vehicle speed estimation means for a right wheel located on the right side of said vehicle and a second estimated vehicle speed calculated by said vehicle speed estimation means for a left wheel located on the left side of said vehicle; and limitation means for limiting the calculation of one of the first and second estimated vehicle speeds by said vehicle speed estimation means in response to the limit value calculated by said limit value calculation means, to keep the estimated vehicle speed calculated for one of said right and left wheels rotating at a relatively low speed to be greater than a value subtracting the limit value from the estimated vehicle speed calculated for the other one of said right and left wheels rotating at a relatively high speed.

2. The vehicle motion control system as claimed in claim 1, wherein said braking force control means controls the braking force applied to each wheel of said vehicle in accordance with one of a plurality of control modes for braking said vehicle, and wherein said limit value calculation means calculates the limit value on the basis of a varying value resulted from at least a change in a coefficient of friction for each wheel of said vehicle, and varied in accordance with one of the control modes selected in said braking force control means.

3. The vehicle motion control system as claimed in claim 2, wherein said limit value calculation means calculates slip rates for said right and left wheels on the basis of the wheel speeds detected by said wheel speed detection means, and calculates a difference between the slip rates of said right and left wheels to provide the varying value resulted from the change in the coefficient of friction.

4. The vehicle motion control system as claimed in claim 1, wherein said vehicle speed estimation means compares the estimated vehicle speed for one of rear wheels of said vehicle to be calculated, with the estimated vehicle speed for one of front wheels of said vehicle located on the same side of the right and left sides of said vehicle as the one of said rear wheels, and selects the larger one out of the one of said rear wheels and the one of said front wheels located on the same side as the one of said rear wheels to provide the estimated vehicle speed for the one of said rear wheels.

5. The vehicle motion control system as claimed in claim 1, wherein said limit value calculation means calculates the limit value on the basis of at least one of a basic limit to a lateral acceleration conversion value resulted from a difference between the wheel speed of said right wheel and the wheel speed of said left wheel, a first limit to a lateral acceleration conversion value resulted from a load shift between said right wheel and said left wheel in a turning motion of said vehicle, a second limit to a lateral acceleration conversion value resulted from a steering angle of said right wheel and said left wheel, and a third limit to a lateral acceleration conversion value resulted from a change in a coefficient of friction for each wheel of said vehicle.

6. The vehicle motion control system as claimed in claim 5, wherein said limit value calculation means sums up the basic limit, the first limit, the second limit and the third limit to provide the limit value.

7. The vehicle motion control system as claimed in claim 5, wherein said braking force control means controls the braking force applied to each wheel of said vehicle in accordance with one of a plurality of control modes for braking said vehicle, and wherein said limit value calculation means provides the third limit in accordance with one of the control modes selected in said braking force control means.

* * * * *